United States Patent
Lim et al.

(10) Patent No.: US 11,175,969 B2
(45) Date of Patent: Nov. 16, 2021

(54) EXTENSIBLE SYSTEMATIC REPRESENTATION OF OBJECTS AND OPERATIONS APPLIED TO THEM

(71) Applicant: Nicira, Inc., Palo Alto, CA (US)

(72) Inventors: Harold Vinson C. Lim, Union City, CA (US); Risi Thonangi, Sunnyvale, CA (US); Igor Ganichev, San Jose, CA (US)

(73) Assignee: Nicira, Inc., Palo Alto, CA (US)

(*) Notice: Subject to any disclaimer, the term of this patent is extended or adjusted under 35 U.S.C. 154(b) by 262 days.

(21) Appl. No.: 15/881,644

(22) Filed: Jan. 26, 2018

(65) Prior Publication Data

US 2019/0235937 A1      Aug. 1, 2019

(51) Int. Cl.
*G06F 9/54* (2006.01)
*G06F 9/455* (2018.01)

(52) U.S. Cl.
CPC ............. *G06F 9/546* (2013.01); *G06F 9/455* (2013.01); *G06F 9/542* (2013.01)

(58) Field of Classification Search
CPC .......... G06F 9/546; G06F 9/455; G06F 9/542; G06F 9/45558; G06F 2009/45579; G06F 2009/45595; G06F 2009/4557
See application file for complete search history.

(56) References Cited

U.S. PATENT DOCUMENTS

| | | | |
|---|---|---|---|
| 6,009,266 A * | 12/1999 | Brownell | G06F 9/4493 719/315 |
| 2003/0004964 A1* | 1/2003 | Cameron | G06F 16/86 |
| 2007/0050431 A1* | 3/2007 | Vaidya | H04L 67/1095 |
| 2014/0289717 A1* | 9/2014 | Chan | G06F 9/54 717/147 |
| 2015/0312118 A1* | 10/2015 | Behera | H04L 45/26 370/241 |
| 2017/0374177 A1* | 12/2017 | Chrysanthakopoulos | G06F 9/541 |

OTHER PUBLICATIONS

VMware "NSX-T Administration Guide, VMware NSX-T Data Center 1.1" Feb. 6, 2017, "https://www.vmware.com/support/nsxt/doc/nsxt_11_api.html" (Year: 2017).*

* cited by examiner

*Primary Examiner* — Doon Y Chow
*Assistant Examiner* — Carina Yun
(74) *Attorney, Agent, or Firm* — Patterson + Sheridan, LLP

(57) ABSTRACT

Disclosed is a technique for communicating message objects from a first process to a second process in transport node of a virtualized network, the message objects specifying a change to status of a virtualized network object in the virtualized network. In technique, message objects are separated from operation objects, which have fields corresponding to the fields of the message objects, a field of the operations object being capable of specifying a change to or a status of a field of the message object to which it corresponds. Yet another object combines a message object and an operation object so that the protocol for communication between the first and second process is the same regardless of the contents of the actual message.

23 Claims, 10 Drawing Sheets

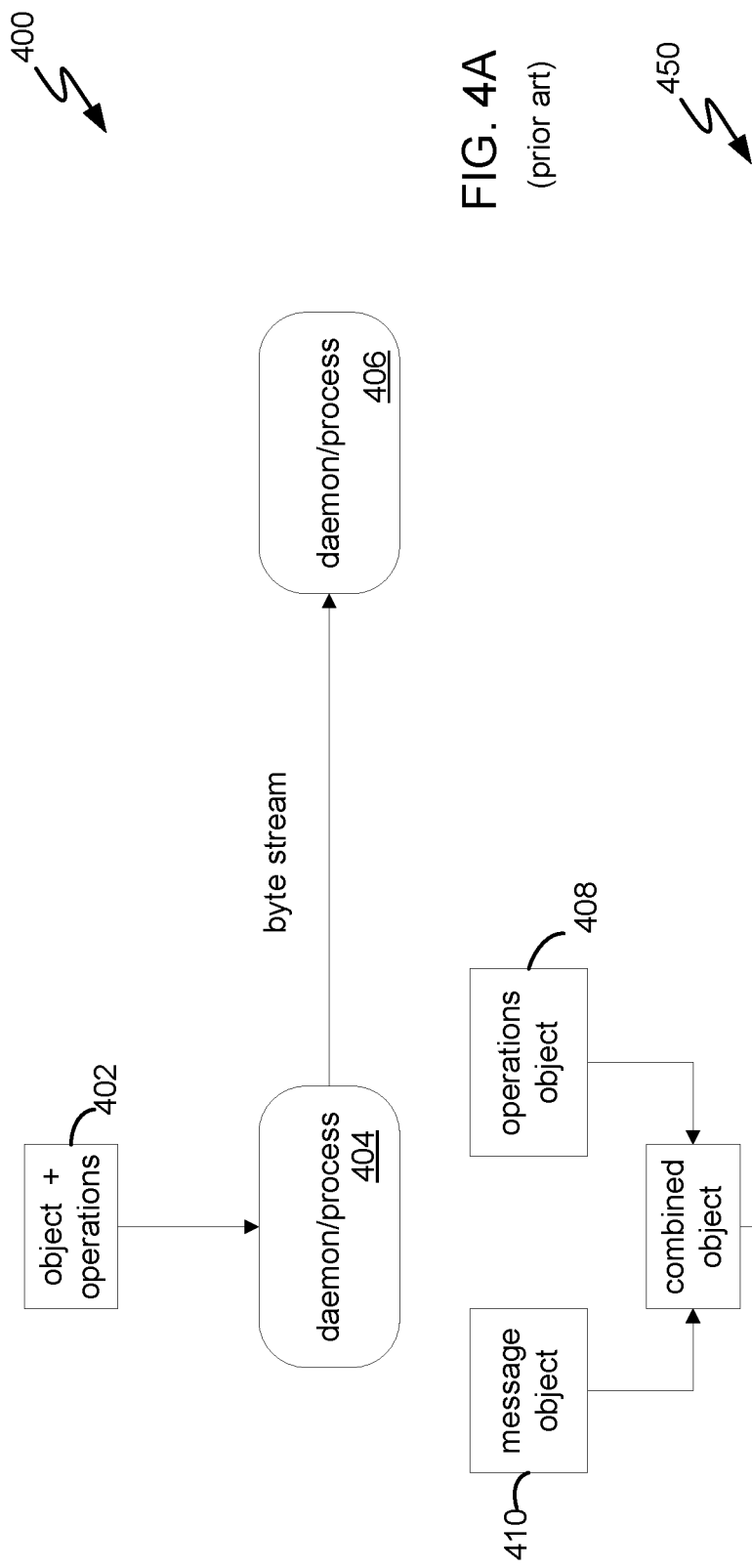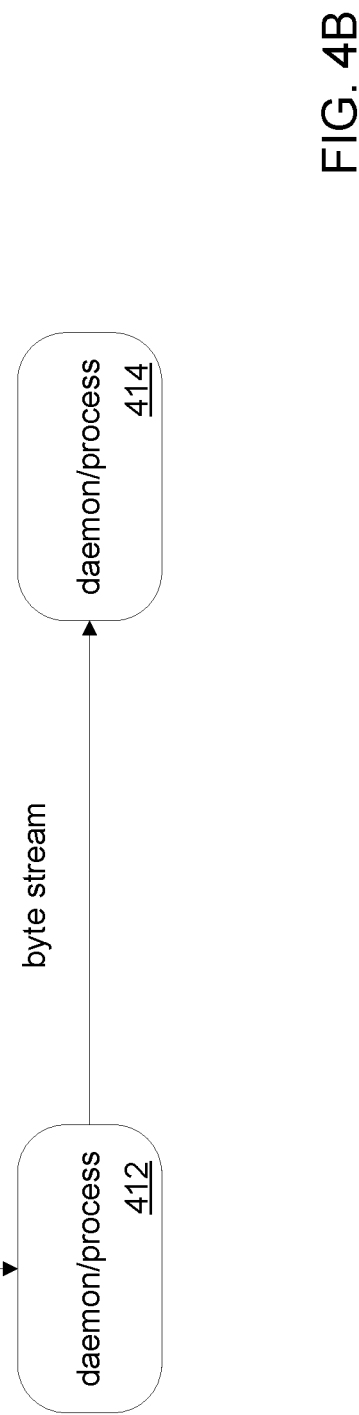
FIG. 4A (prior art)
FIG. 4B

EXTENSIBLE SYSTEMATIC REPRESENTATION OF OBJECTS AND OPERATIONS APPLIED TO THEM

BACKGROUND

In much the same way that server virtualization programmatically creates, snapshots, deletes and restores software-based virtual machines (VMs), NSX-T network virtualization programmatically creates, snapshots, deletes, and restores software based virtual networks.

In network virtualization, a network hypervisor reproduces the complete set of protocol layers from Layer 2 to Layer 7 in software. Consequently, these services can be assembled in any arbitrary combination to produce a virtual network in seconds.

The network virtualization implements three separate planes, management plane 104, control plane 106/108, and data plane 112 as depicted in FIG. 1A. Management plane 104 allows the platform to process large-scale concurrent API requests from a cloud layer. Control plane 106/108 keeps track of the real-time virtual networking and security state of the system. Control plane 106/108 is split into two parts, a central control plane 106 and a local control plane (LCP) 108. LCP 108 runs on the compute endpoints, which are known as transport nodes 110. Data plane 112 includes a host switch, which enables the overlay network, as well as traditional VLAN-based topology.

Transport node 110 hosts various LCP daemons and a local data plane that includes a forwarding engine. Transport node 110 further includes storage, which contains all of the data for defining and controlling the behavior of the transport node. All of the daemons and processes running in the transport node interact with the storage via an established interface to carry out their assigned functions. In one embodiment, the storage is a database.

The daemons and processes that run in the transport node also need to communicate with each other. Currently, it is left to each daemon or process as to how to communicate a change to an object in the database. This leads to lots of duplicated efforts and inflexibility when defining or updating new object definitions. Also, the object definition and its associated operations are intertwined in the protocol by which the daemons and processes communicate. This leads to the protocol being inflexible, as it is unable to express fine-grained changes to the objects. Accordingly, a standardized way of representing objects and a method for describing operations applied to these objects is needed.

BRIEF DESCRIPTION OF DRAWINGS

FIG. 4A depicts the objects that are used to send a message in the prior art.

FIG. 4B depicts the objects that are used to send a message in an embodiment.

DETAILED DESCRIPTION

Figure 1A:
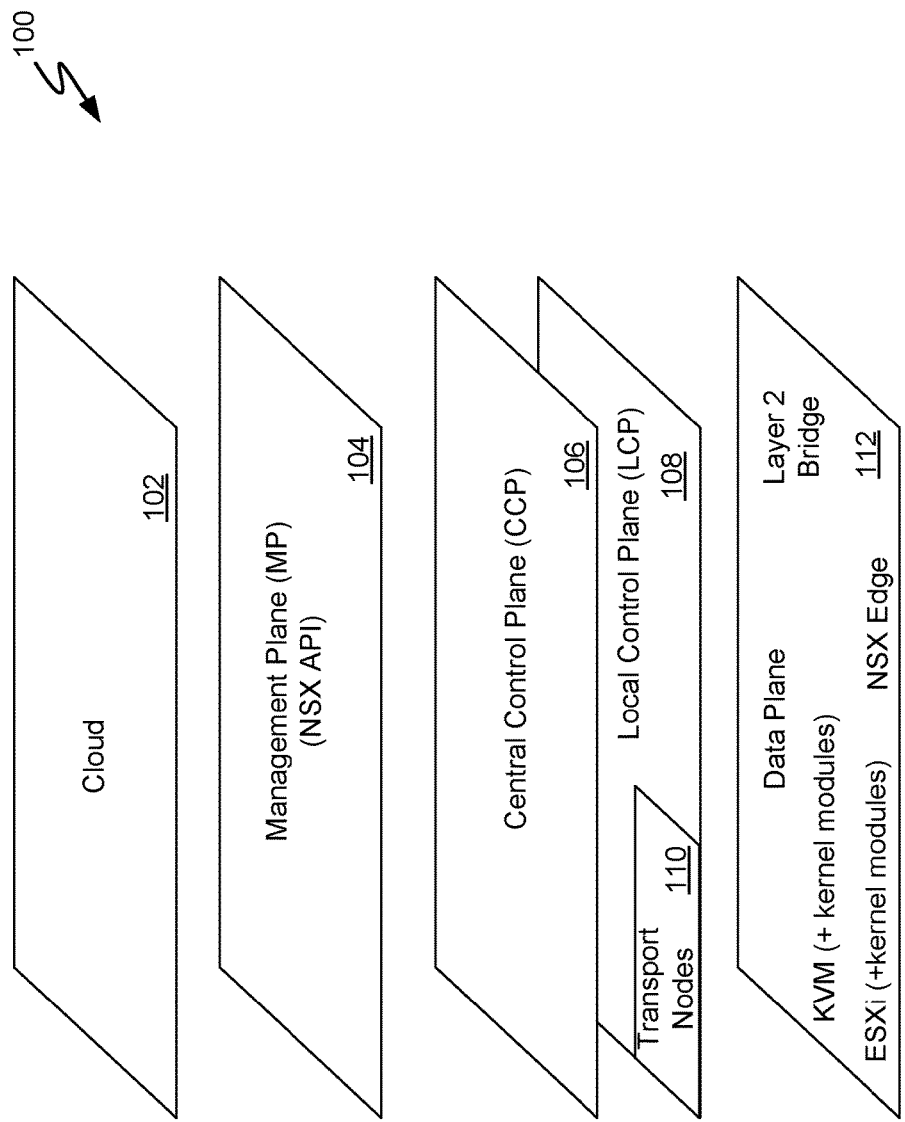
FIG. 1A depicts an architecture for implementation of network virtualization as three separate planes, management, control, and data.
Figure 1B:
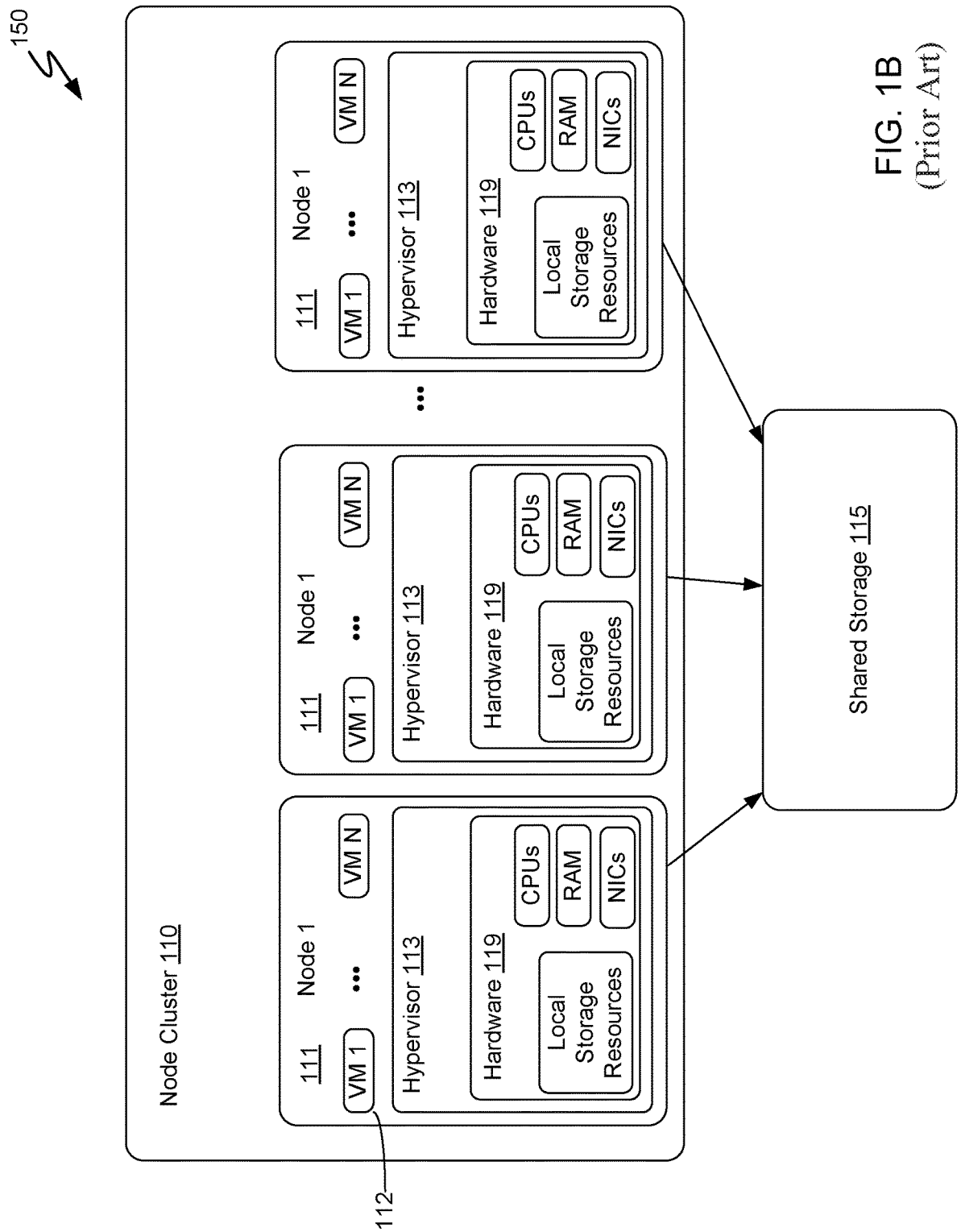
FIG. 1B depicts a cluster of nodes supporting virtual machines in which embodiments described herein may operate.

FIG. 1B depicts a cluster 110 of nodes supporting virtual machines in which embodiments described herein may operate. As depicted in the configuration 150 of FIG. 1B, each node 111 includes a virtualization layer or hypervisor 113, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Each node 111 connects to shared storage 115.

In one embodiment, processes and daemons of local control plane 108 and data plane 112 run in hypervisor 113. In another embodiment, processes and daemons of local control plane 108 and data plane 112 run in virtual machine 112.

Figure 2:
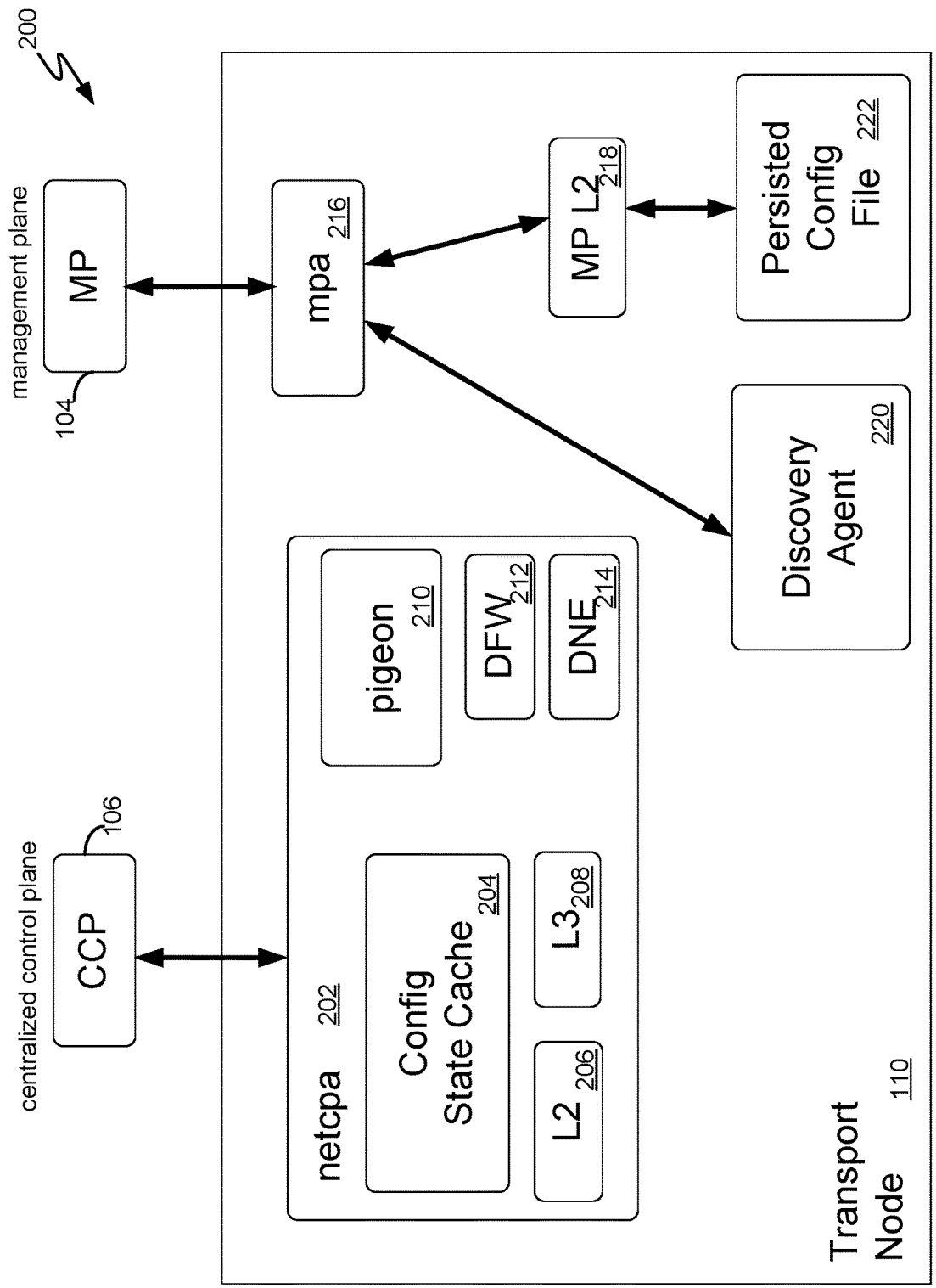
FIG. 2 depicts an arrangement of daemons and processes in a transport node in one embodiment.

FIG. 2 depicts an arrangement of daemons and processes in a transport node in one embodiment. Transport node 110 includes a management plane agent 216, a management plane (MP) L2 218, a discovery agent 220, a persisted configuration file 222, and a network control plane agent netcpa 202. Management plane agent 216 interacts with MP L2 218, discovery agent 220 and persisted configuration file 222 within the transport node and management plane 104 external to the node. Network control plane agent 202 interacts with centralized control plane 106 and includes a configuration state cache 204, L2 services 206 and L3 services 208, a Pigeon API 210, a distributed firewall (DFW) 212 service and a distributed network encryption (DNE) 214 service.

Figure 3A:
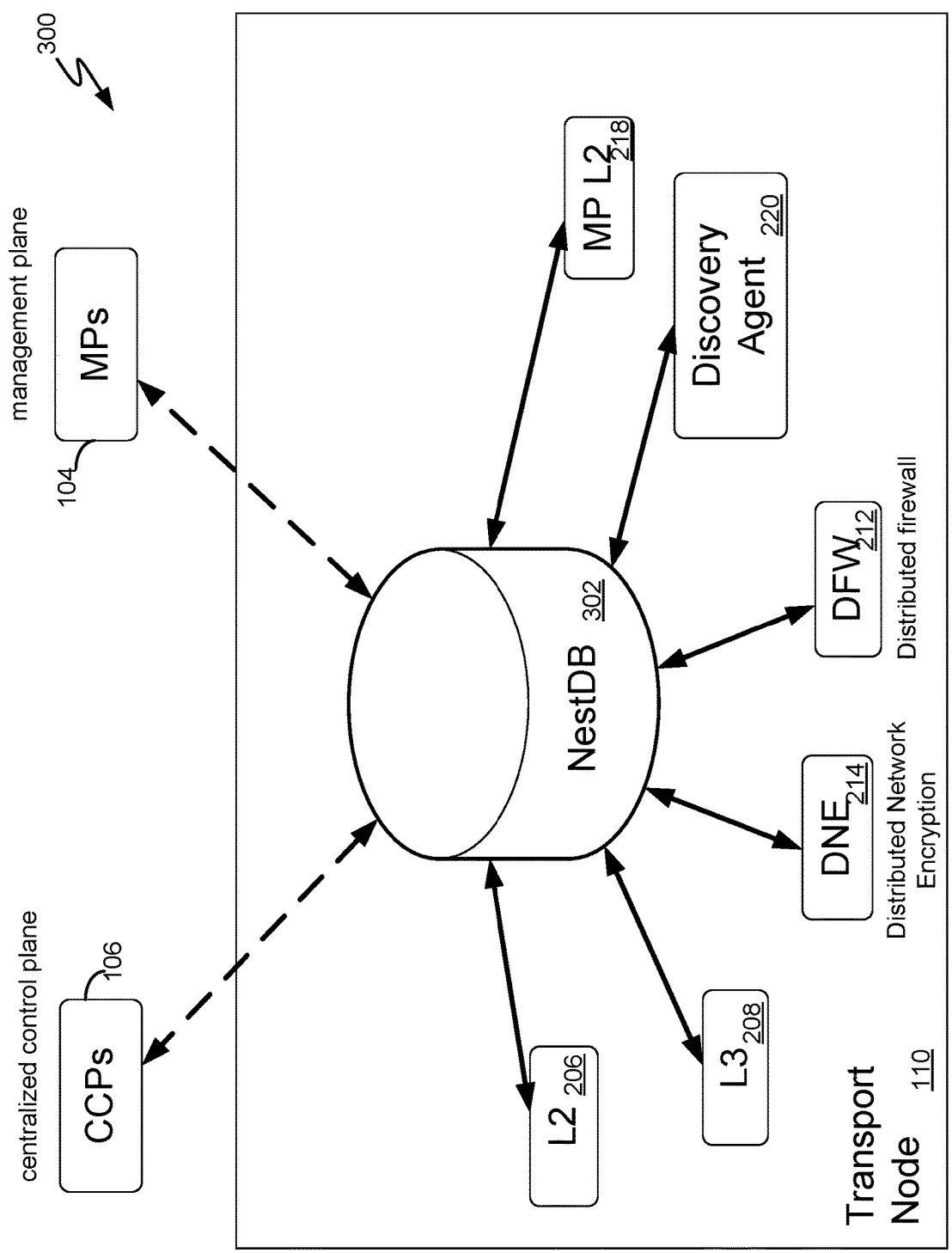
FIG. 3A depicts an arrangement of daemons and processes in a transport node in another embodiment.
Figure 3B:
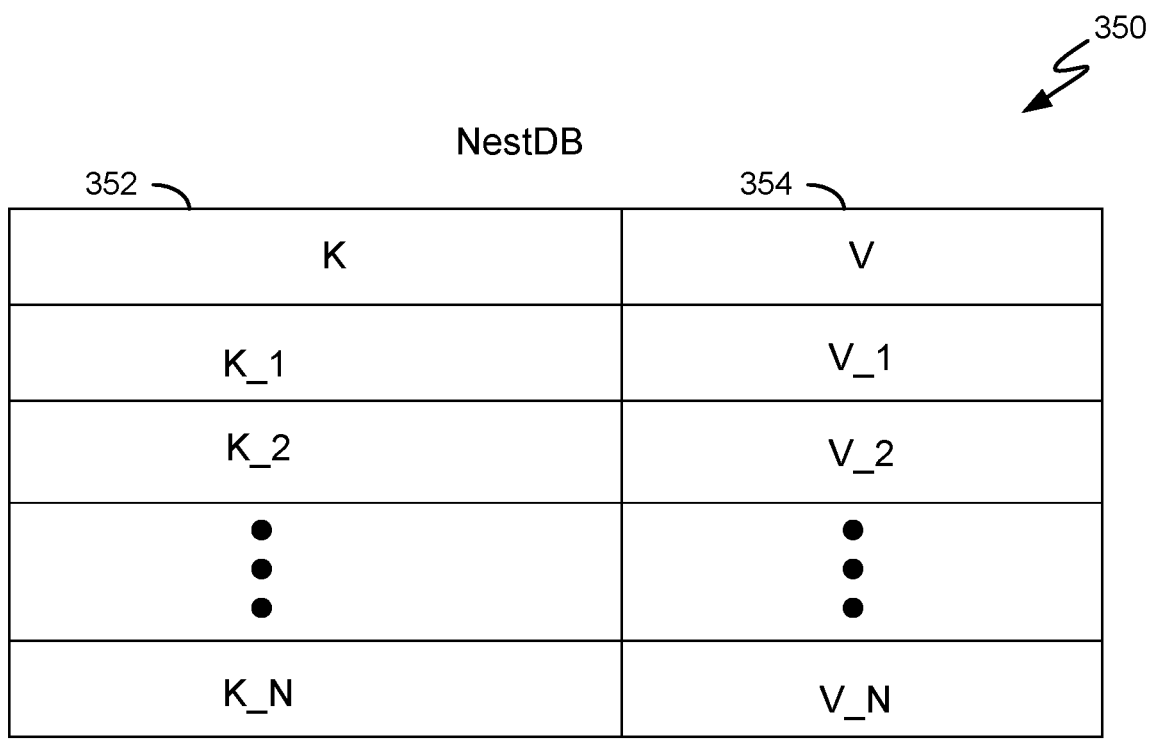
FIG. 3B depicts the layout of a database in the embodiment of FIG. 3A.

FIG. 3A depicts an arrangement of daemons and processes in a transport node in another embodiment. In this embodiment, transport node 110 includes a database (NestDB) 302, along with L2 services 206 and L3 services 208, MP L2 service 218, discovery agent 220, DNE 214 service and DFW 212 service. Centralized control plane 106 and management plane 104 interact directly with database 302. In one embodiment, database 302 stores objects as serialized strings. If a single bit in the serialized string needs to be changed, then the string for the entire object is read from the disk, de-serialized, changed, serialized and written back to the disk FIG. 3B depicts the layout of a database in the embodiment of FIG. 3A. Database NestDB 302 in one embodiment is a key-value database, the values 354 of the keys 352 being message objects as described below and other configuration data for the transport node.

FIG. 4A depicts the objects that are used in the prior art to send a message. In FIG. 4A, a single object 402 that defines both the used fields and the operations on the fields is serialized into a byte stream and sent from daemon/process 404 to daemon/process 406.

For example, in Table 1, single object L3ConfigMsg 402 has the following fields, written in the protobuf language, where the first item specifies whether the field is required or optional, the second item specifies the data type of the variable in the third item, the third item is the variable and the fourth item specifies the position in the serialized version of the message. Thus, in optional UuidMsg log_router_uuid=1 of Table 1, the first item is "optional", the second item is "UuidMsg", the third item is "log_router_uuid", and the fourth item is "=1".

TABLE 1

Single Message object

```
message L3ConfigMsg {
    optional UuidMsg log_router_uuid = 1;
    optional uint32 router_id = 2;
    optional UuidMsg entity_uuid = 3;
    optional config.EntityType entity_type = 4;
    optional L3EntityUpdateMsg entity_update = 5;
    optional LogRouterTunableMsg tunable_update = 6;
    optional DhcpUpdateMsg dhcp_update = 7;
    optional SubnetUpdateMsg subnet_update = 8;
    optional ArpTableUpdateMsg arp_update = 9;
}
```

From the above, it is clear that single object 402 combines both fields and operations into the same object because both the object has types indicating a simple or complex variable type as well as message (Msg) types. If different fields and/or messages need to be included and updated, then a new single object must be generated. Furthermore, receipt of each new single object requires that both the sender and receiver of the message need new programming to respectively determine how to generate and interpret the new message. This creates a proliferation of single objects and becomes unmanageable as new objects are needed.

FIG. 4B depicts the objects that are used to send a request message in an embodiment. In FIG. 4B, an object 410 that contains the fields of the message is created. When the request message is a write type of request message, a separate and distinct operations object 408 specifies the updates, such as sets, clears, inserts, updates, and appends, to the fields or conditions of the fields of the message object. Alternatively, when the request message is a read type of request message, the separate operations object 408 specifies operations that select fields or check fields for equality or containment. Object 410 and operations object 408 are then combined into a message that is serialized into a byte stream and sent from daemon/process 412 to daemon/process 414.

For example, in Table 2 the message object LogSwitchConfig message has the following fields in the protobuf language.

TABLE 2

Message Object

```
message LogSwitchConfigMsg {
    optional UuidMsg id = 1;
    optional uint32 vni = 2;
    optional LogSwitchReplicationMode replication_mode = 3;
    optional TransportBindingType transport_binding = 4;
    optional uint32 vlan = 5;
    optional bool admin_state_up = 6;
    optional UuidMsg transportZone_id = 7;
    optional UuidMsg routing_domain_id = 8;
}
```

In Table 3, the operations object message has the following fields in the protobuf language, where the first item specifies whether the field is optional or required, the second item specifies that an update operation may be applied to the field, the third item specifies the variable and the fourth item specifies the position in the serialized message.

TABLE 3

Message Operation Object

```
message LogSwitchConfigOpMsg {
    optional OpMsg self = 5001;
    optional UuidOpMsg id = 1;
    optional OpMsg vni = 2;
    optional OpMsg replication_mode = 3;
    optional OpMsg transport_binding = 4;
    optional OpMsg vlan = 5;
    optional OpMsg admin_state_up = 6;
    optional UuidOpMsg transportZone_id = 7;
    optional UuidOpMsg routing_domain_id = 8;
}
```

Thus, the variables in the operations object message are the same as those of the message object, except that a "self" variable is included and the types for each variable are OpMsg types or include OpMsg types if type is a complex type. The "self" variable allows for an operation to be applied on the entire LogSwitchConfigMsg object instead of just applying an operation to a specific field in the object.

Separating the message object and the operations object allows the operations message object to be automatically constructed, e.g., by a compiler, from the fields of the message object. In addition, all possible updates to the fields or conditions on the fields in the message object are available without a proliferation of different objects.

An actual types of change or status operations are specified in the definition of the OpMsg, an example of which is set forth below in Table 4 in the protobuf language.

TABLE 4

Message Operation Types

```
message OpMsg {
    enum Operation {
        INVALID = 0;
        SELECT = 1;
        EQUALS = 2;
        CONTAINS_ONE = 3;
        CONTAINS_ALL = 4;
        IS_PRESENT = 5;
        NOT_EQUALS = 6;
        SET = 7;
        CLEAR = 8;
        INSERT = 9;
        APPEND = 10;
        REMOVE = 11;
        UPDATE = 12;
    }
}
```

Write type operations for changing a field include set, clear, insert append, remove and update. Read type operations for obtaining status of a field include select, equals, contains_one, contains_all, is_present, and not_equals.

Figure 5:
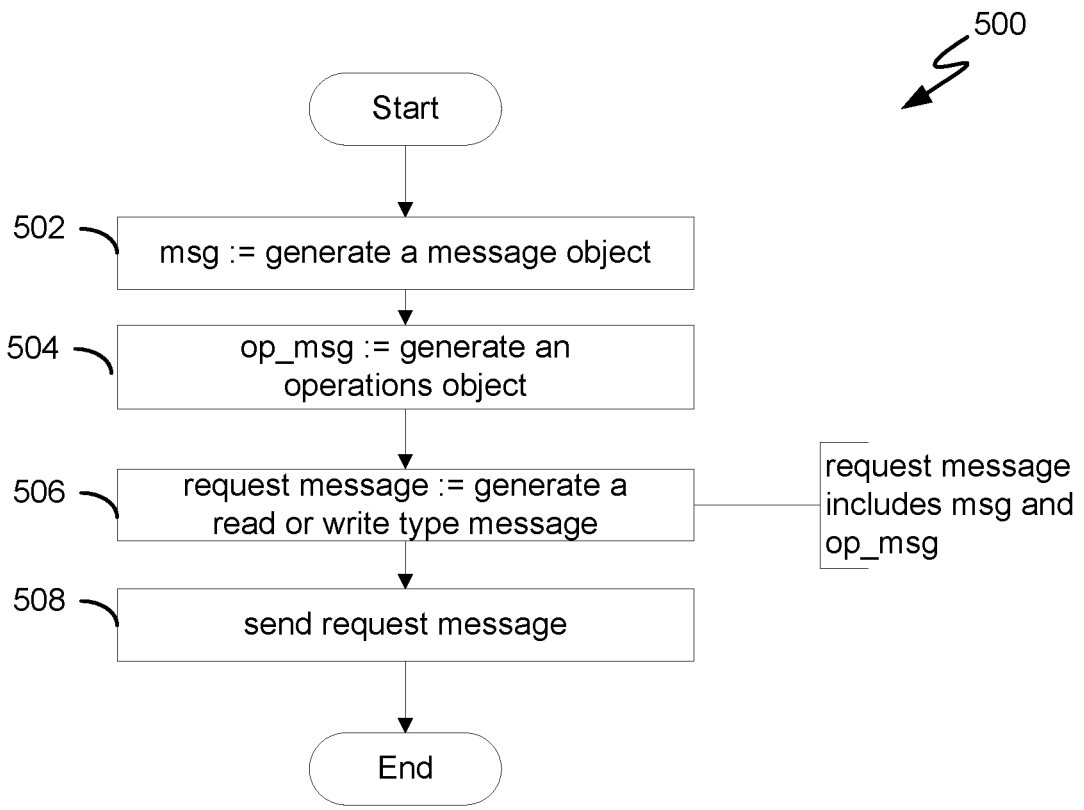
FIG. 5 depicts the steps by which a daemon or process in FIG. 3A sends a message to another daemon or process.

FIG. 5 depicts the steps by which a daemon or process or centralized control plane in FIG. 3 sends a message to another daemon or process. In step 502, a new message object is created. In step 504, a new operations message object is created. As mentioned above, the new operations message can specify either write or read type operations. In step 506, a request message is created based on the message object and the operations message object. Steps 502-506 can be performed by a user or an automated process. In step 508, the daemon, process or centralized control plane in FIG. 3 sends the request message to another daemon.

Figure 6:
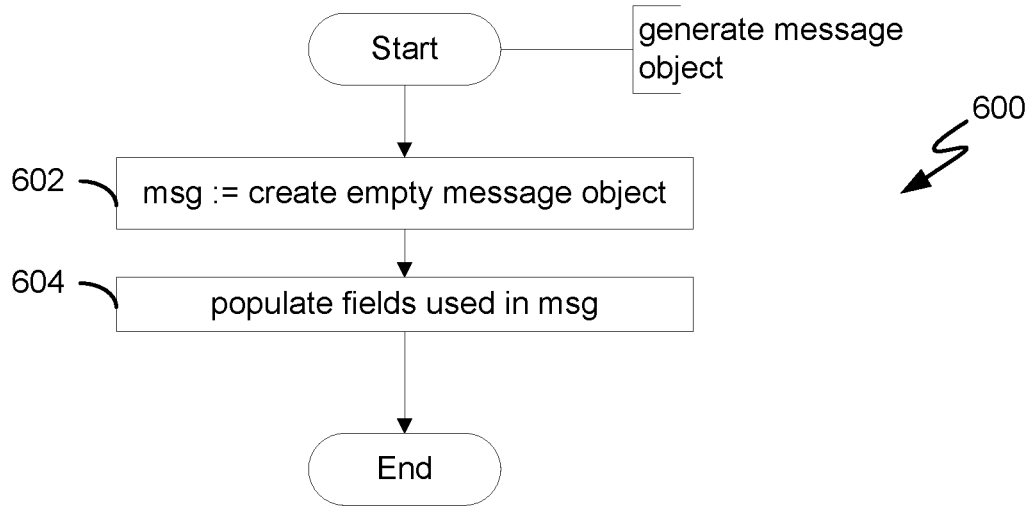
FIG. 6 depicts the steps by which a message object is generated.

FIG. 6 depicts the steps by which a message object is generated. In step 602, an empty new message object is formed and instep 604, fields to be used are populated in the new message object. Steps 602-604 can be performed by a user or an automated process.

For example, the following code in Table 5 creates generates the message object and populates the fields.

TABLE 5

Code for setting fields in message object

```
logSwitchConfigMsg log_switch_msg;
log_switch_msg.mutable_id( )→set_left(0);
log_switch_msg.mutable_id( )→set_left(1);
```

Figure 7:
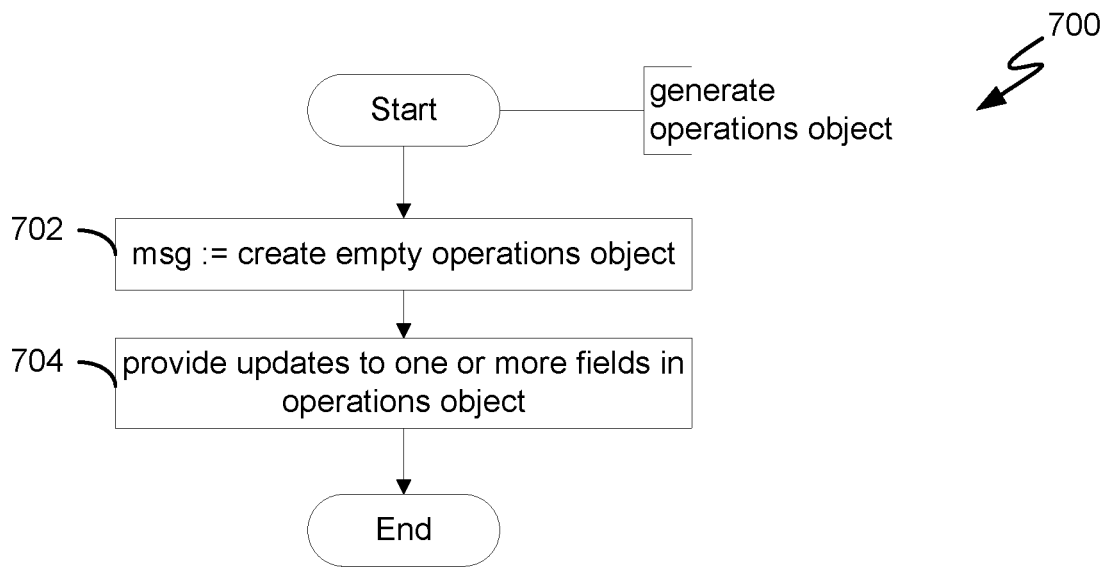
FIG. 7 depicts the steps by which a new operations message object is generated.

FIG. 7 depicts the steps by which a new operations message object is generated. In step 702, an empty new operations object is created. The operations object has the same fields as the new message object, but the fields have a different type. In step 704, a daemon or process in FIG. 3 provides updates to the fields in the operations object. Step 702 can be performed by a user or an automated process. For example, a compiler can copy the fields of the message object generated in FIG. 6 and add the message type to the fields.

For example, the following code in Table 6 creates the operations message object and populates the fields.

TABLE 6

Code for setting fields in message operations object

```
logSwitchConfigOpMsg log_switch_op_msg;
log_switch_op_msg.mutable_vlan( )→set_op(SET)
```

Figure 8:
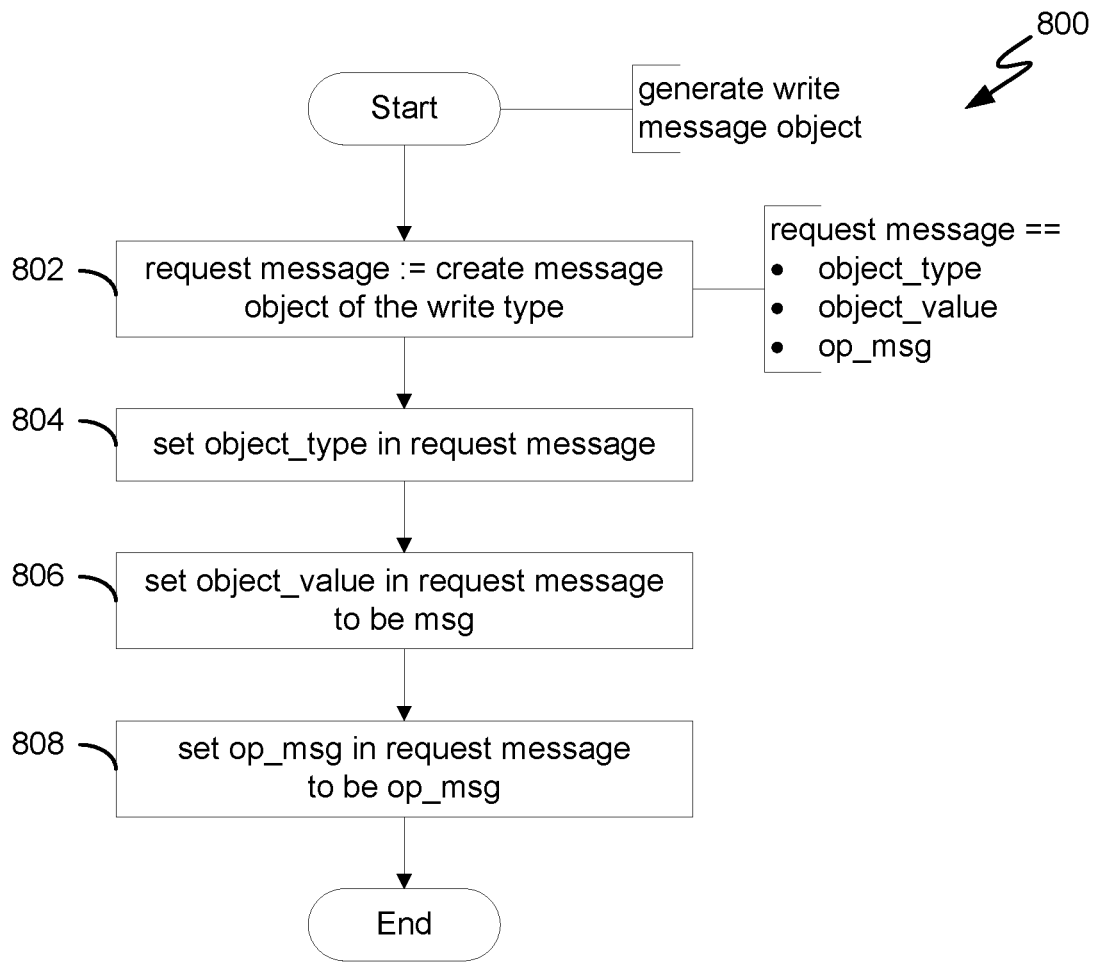
FIG. 8 depicts the steps by which a write object message is generated.

FIG. 8 depicts the steps by which a request message is generated. In step 802, a new request message is generated, which in the example given is a write type message. The new request message has an object_type field, an object_value field and an op_msg field as set forth below in the protobuf language in Table 7.

TABLE 7 request message type

```
service write {
    optional ObjectType object_type = 1;
    optional bytes object_value = 2;
    optional bytes op_msg = 3;
}
```

In step 804, the object_type is set to indicate the type of object, such as an object in the local control plane, which is being written. Step 804 is performed by a user or an automated process. In step 806, a daemon or process or the central control plane in FIG. 3 sets the object_value field to refer to the newly generated message generated as shown in FIG. 6. In step 808, the daemon, process or central control plane in FIG. 3 sets the op_msg field to refer to the newly generated op_msg, as shown in FIG. 7.

For example, the following code in Table 8 creates the actual write message, which in this case is a write type request.

TABLE 8

Code for setting fields in new request message

```
write write_msg;
write_msg.set_object_type(LOG_SWITCH_CONFIG);
write_msg.set_object_value(SerializeToBytes(log_switch_msg)
write_msg. set_op_msg(SerializeToBytes(log_switch_op_msg));
```

Figure 9:
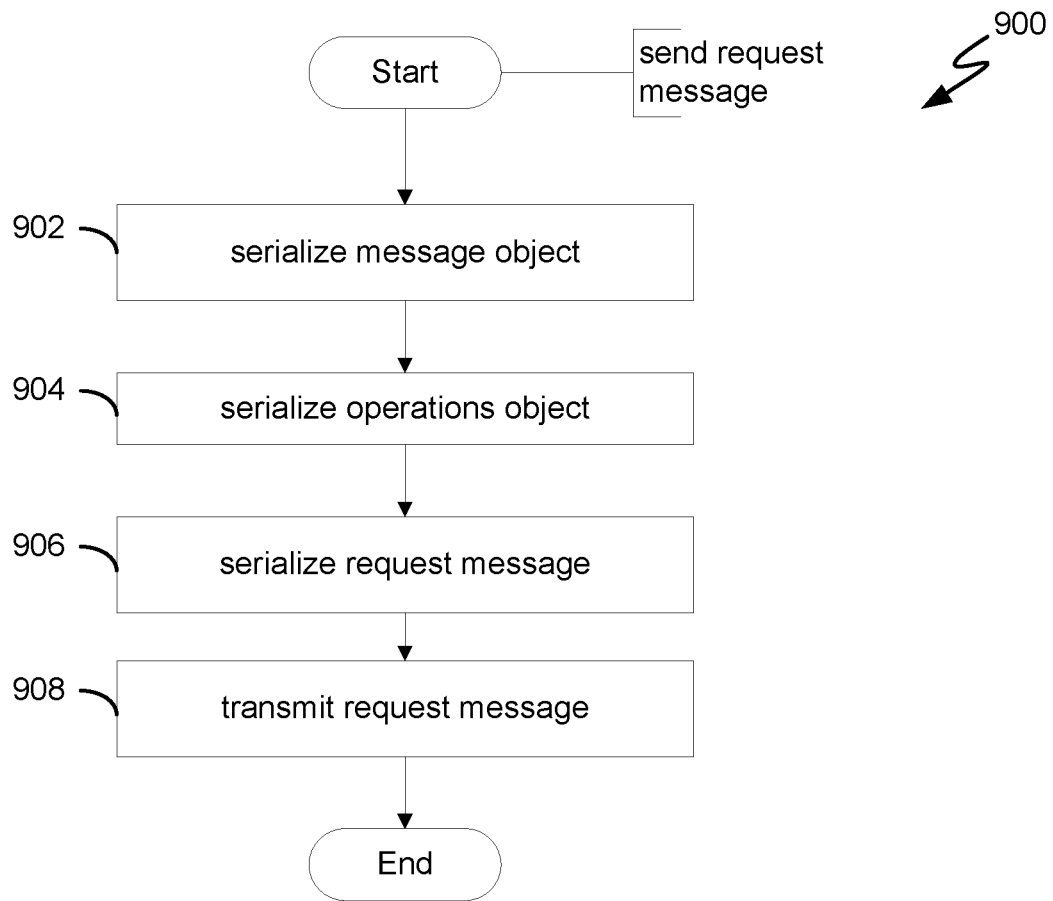
FIG. 9 depicts the steps by which the newly generated write object is transmitted

FIG. 9 depicts the steps by which the newly generated request message is transmitted. In step 902, the message object is serialized. In step 904, the operations object is serialized and in step 906, the request message is serialized. Steps 902, 904 and 906 are performed by the daemon, process or centralized control plane. In step 908, the daemon, process or centralized control plane of FIG. 3 sends the request message.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for communication between processes in a transport node of a virtualized network, comprising:
    generating, by a first process of the transport node of the virtualized network, a message object having a first set of fields, each field having a variable;
    generating, by the first process, an operations object having a second set of fields, wherein for each field in the first set of fields, the second set of fields has a field that includes the same variable as its corresponding field in the first set of fields and an operation type that specifies a type of operation to be performed on the variable of the associated field in the first set of fields;
    generating, by the first process, a request message by combining the message object and the operations object, the request message specifying one of a read from or write to a virtualized object of the virtualized network; and
    sending, from the first process, the request message to a second process of the transport node of the virtualized network to change, or obtain a status of, the virtualized object.

2. The method of claim 1, wherein generating the message object includes:
    creating an empty message object; and
    populating the empty message object with the first set of fields to form the message object.

3. The method of claim 1, wherein generating the operations object includes:
    creating an empty operations object, the operations object having the second set of fields; and
    providing one of the changes to or status of one or more of the second set of fields in the operations object.

4. The method of claim 1, wherein generating the request message includes:
    creating an empty request message, the empty request message containing an object type field, an object value field and an operation message field;
    setting the object type field in the request message to be a type of write message or read message;
    setting the object value field in the request message to be the message object; and
    setting the operation message field in the request message to be the operations object.

5. The method of claim 1, wherein sending the request message to the second process includes serializing the request message into a byte stream and sending the serialized byte stream to the second process.

6. The method of claim 5, wherein serializing the request message includes serializing the message object and serializing the operations object.

7. The method of claim 1,
    wherein the first set of fields in the message object has a particular type; and
    wherein the second set of fields in the operations object has a type that is different from the particular type of fields in the message object.

8. The method of claim 1, wherein when the message object indicates a write operation, the second set of fields in the operation object indicates a change in at least one field in the first set of fields of the message object, and wherein when the message object indicates a read operation, the second set of fields in the operations object indicates a status of at least one field in the first set of fields of the message object.

9. The method of claim 1, wherein the operations object in the request message specifies which fields of the virtualized object are to be modified or read.

10. A non-transitory computer readable medium containing instructions for communication between processes in a transport node of a virtualized network and which when executed by one or more processors, perform the steps of:
    generating, by a first process of the transport node of the virtualized network, a message object having a first set of fields, each field having a variable;
    generating, by the first process, an operations object having a second set of fields, wherein for each field in the first set of fields, the second set of fields has a field that includes the same variable as its corresponding field in the first set of fields and an operation type that specifies a type of operation to be performed on the variable of the associated field in the first set of fields;
    generating, by the first process, a request message by combining the message object and the operations object, the request message specifying one of a read from or write to a virtualized object of the virtualized network; and
    sending, from the first process, the request message to a second process of the transport node of the virtualized network to change, or obtain a status of, the virtualized object.

11. The non-transitory computer readable medium of claim 10, wherein generating the message object includes:
    creating an empty message object; and
    populating the empty message object with the first set of fields to form the message object.

12. The non-transitory computer readable medium of claim 10, wherein generating the operations object includes:
    creating an empty operations object, the operations object having the second set of fields; and
    providing one of the changes to or status of one or more of the second set of fields in the operations object.

13. The non-transitory computer readable medium of claim 10, wherein generating the request message includes:
creating an empty request message, the empty request message containing an object type field, an object value field and an operation message field;
setting the object type field in the request message to be a type of write message or read message;
setting the object value field in the request message to be the message object; and
setting the operation message field in the request message to be the operations object.

14. The non-transitory computer readable medium of claim 10, wherein sending the request message to the second process includes serializing the request message into a byte stream and sending the serialized byte stream to the second process.

15. The non-transitory computer readable medium of claim 14, wherein serializing the request message includes serializing the message object and serializing the operations object.

16. The non-transitory computer readable medium of claim 10,
wherein the first set of fields in the message object has a particular type; and
wherein the second set of fields in the operations object has a type that is different from the particular type of fields in the message object.

17. A computer system comprising:
one or more processors;
a hypervisor for virtualizing and managing a virtualized network, the virtualized network including a transport node having one or more processes operating therein and one or more virtualized network objects; and
a memory coupled to the one or more processors, the memory containing instructions which, when executed by the one or more processors, carry out the steps of:
generating, by a first process of the transport node of the virtualized network, a message object having a first set of fields, each field having a variable;
generating, by the first process, an operations object having a second set of fields, wherein for each field in the first set of fields, the second set of fields has a field that includes the same variable as its corresponding field in the first set of fields and an operation type that specifies a type of operation to be performed on the variable of the associated field in the first set of fields;
generating, by the first process, a request message by combining the message object and the operations object, the request message specifying one of a read from or write to a virtualized object of the virtualized network; and
sending, by the first process, the request message to a second process of the transport node of the virtualized network to change, or obtain a status of, the virtualized object.

18. The computer system of claim 17, wherein generating the message object includes:
creating an empty message object; and
populating the empty message object with the first set of fields to form the message object.

19. The computer system of claim 17, wherein generating the operations object includes:
creating an empty operations object, the operations object having the second set of fields; and
providing one of the changes to or status of one or more of the second set of fields in the operations object.

20. The computer system of claim 17, wherein generating the request message includes:
creating an empty request message, the empty request message containing an object type field, an object value field and an operation message field;
setting the object type field in the request message to be a type of write message or read message;
setting the object value field in the request message to be the message object; and
setting the operation message field in the request message to be the operations object.

21. The computer system of claim 17, wherein sending the request message to the second process includes serializing the request message into a byte stream and sending the serialized byte stream to the second process.

22. The computer system of claim 21, wherein serializing the request message includes serializing the message object and serializing the operations object.

23. The computer system of claim 17,
wherein the first set of fields in the message object has a particular type; and
wherein the second set of fields in the operations object has a type that is different from the particular type of fields in the message object.

\* \* \* \* \*